June 21, 1927.
L. J. DALES
1,633,071
METHOD OF PRODUCING CARBON BLACK
Original Filed April 4, 1921
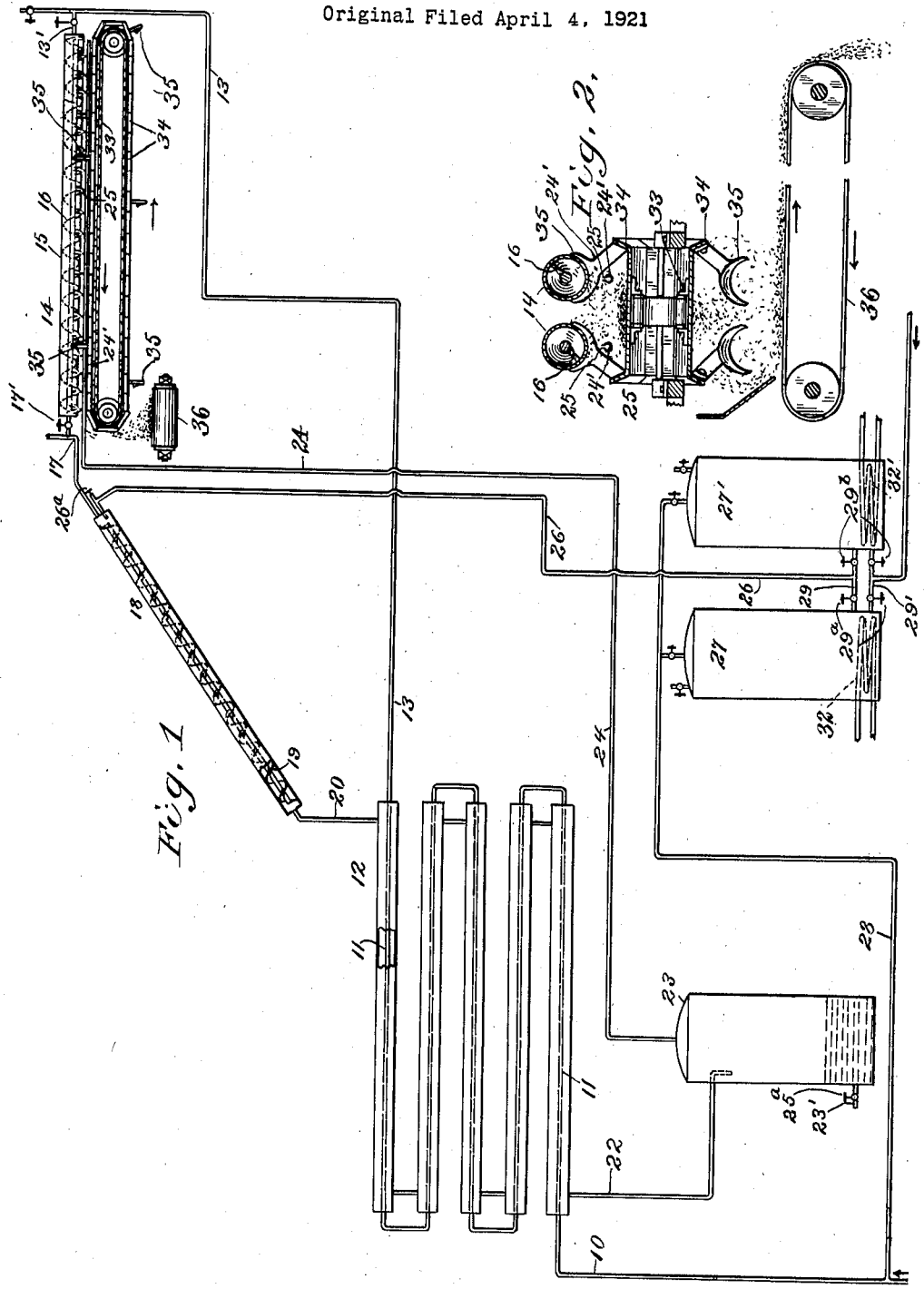

Patented June 21, 1927.

1,633,071

UNITED STATES PATENT OFFICE.

LEWIS J. DALES, OF MOUNT VERNON, NEW YORK.

METHOD OF PRODUCING CARBON BLACK.

Application filed April 4, 1921, Serial No. 458,370. Renewed August 27, 1924.

My invention relates to improvements in methods of producing carbon black from gaseous hydrocarbons, and the same has for its object more particularly to provide a simple, efficient and economical method of producing carbon black from natural gas.

Further, said invention has for its object to provide a method of producing carbon black in which the gasoline and other condensible hydrocarbons present in the natural gas, and which are ordinarily wasted in the production of carbon black, will be conserved and rendered available for other industrial purposes.

Further, said invention has for its object to provide a method of producing carbon black in which the gas, from which the carbon black is directly produced, is utilized to heat the gas subsequent to the separation of the gasoline or volatile or condensible hydrocarbons from such gas.

Further, said invention has for its object to provide a method of producing carbon black in which the natural gas is first raised in temperature to a predetermined degree and thereupon chilled in order effectively to separate the gas from the gasoline or other condensible hydrocarbons.

Further, said invention has for its object to provide a method by which the production of carbon black is attained at a substantially uniform temperature.

Other objects will in part be obvious, and in part be pointed out hereinafter.

To the attainment of the aforesaid objects and ends, my invention consists in the method comprising the successive steps hereinafter more fully described and then pointed out in the claims.

In the accompanying drawings forming part of this specification, wherein like numerals of reference indicate like parts,—

Figure 1 is a diagrammatic view showing one form of apparatus for carrying out my said invention; and Fig. 2 is a diagrammatic end view of a pair of heating chambers showing the means for removing and conveying the produced carbon black.

In producing carbon black according to my invention, the raw gas is received from its source and conveyed by a pipe 10 to the inner tubes 11 of a condenser 12. After passing sucessively through the several inner tubes of the condenser 12, the gas is conducted by a pipe 13 and branch pipes 13' into a plurality of horizontal heating chambers 14. The heating chambers 14 each consist of a tubular chamber 15 closed at its ends and having disposed therein a spiral partition 16, similar to the spiral which is used in heating chambers and the like, in order to provide a long gas travel in contact with the heated surface thereof. The spiral 16, however, is rigidly secured within the tube 14 and completely fills the same, and is not movable or rotating as is the case in mixers as generally constructed. The heated gas issuing from the outlet ends of the heating chambers 16 is thence conducted by branch pipes 17' and a pipe 17 to an inclined mixer 18, which also contains a rigid spiral partition 19, as described in connection with the heating chambers 14.

From the lower end of the inclined mixer 18 extends a pipe 20 which is connected to the uppermost outer tube of the condenser 12. The heated gas passes in sucession through the series of outer tubes of the condenser 12, in which the gas is separated from the condensible fluids, and the condensate thence conducted by a pipe 22 to an accumulator tank 23. The condensible fluids which settle in the bottom of the tank 23 may thence be drawn off by a pipe 24 controlled by a valve 25ª to a suitable receptacle or container, while the gas is conducted by a pipe 24 extending from the top of the accumulator tank 23 to the branch pipes 24'. The branch pipes 24' are severally provided with a series of burners 25 arranged directly below each of the tubular heating chambers 15, and serve to heat said chambers 15, and at the same time form the deposit of carbon black upon the lower, outer surfaces of said chambers 14.

When the gas conducted from the tank 23 to the burners 25 is of a wild or unstable nature as it leaves the heating chambers 14 by the pipes 17, 17', then a blending medium consisting of an oil distillate, such, for example, as kerosene, naphtha or the like by-products, in order to stabilize the volatile hydrocarbons, may be introduced into the mixer 18 through a pipe 26 connected with an atomizer 26ª located at the inlet end of the mixer 18. The blending medium is drawn from tanks 27, 27', which are maintained under pressure by gas received through the pipe 28 extending from the source of gas supply to the upper ends of said tanks 27, 27'.

The tanks 27, 27' have their lower ends connected by pipes 29, 29' provided with suitable valves 29ᵃ, 29ᵇ, and the pipe 29' is connected to a source of blending medium supply.

In order to prevent the blending medium chilling the gas received from the heating chambers 14 before the same enters the condenser 12, the tanks 27, 27' may be provided just above the bases thereof with heating coils 32, 32' leading from a suitable source of steam supply, whereby the blending material may be heated to the desired degree.

In order to collect the carbon black deposited upon the under side of the tubular heating chambers 15, a series of conveyer belts are disposed longitudinally below each tubular heating chamber 15, and upon said belts 33 are provided sectional trays 34 which form a continuous trough or carrier.

Certain of the trays 34 are provided with curved blades or scrapers 35, which are adapted to scrape against the under sides of the tubular heating chambers 15, and remove the carbon black which has accumulated thereon and cause the same to be deposited upon the trays 34.

Adjacent to one end of the chain belt 33 is disposed a transverse conveyer upon which the carbon black conveyed by the chain belt 33 and tray 34 may be deposited in order to conduct the same to a point of collection.

It is to be noted particularly that the hot gases after passing from the mixing chamber 18 to the outer tubes of the condenser 12, are cooled by the incoming raw gas conducted to the inner tubes 11 of the condenser in the course of their travel to the heating chambers 15, and that the gas used for the production of the carbon black upon the outer surfaces of the tubular heating chambers 15 is received from the accumulator tank 23 by way of the pipe 24.

The gas, which is conducted to the burners 25 on the branch pipes 24', located below the heating chambers 15, is that which is received from the accumulator tank 23 after the same has passed through the condenser 12, and thereby separated from the gasoline or other fluids which have been condensed and collected in the tank 23.

Having thus described my invention, what I claim and desire to secure by Letters Patent is:

1. The method of producing carbon black from natural gas which comprises taking the raw gas, heating the same, utilizing the raw gas to chill said heated gas whereby to condense the condensible hydrocarbons present therein, and burning the remaining gas whereby to form a deposit of carbon black, substantially as specified.

2. The method of producing carbon black which comprises taking the raw hydrocarbon gas, heating the same, chilling the heated gas to condense the condensible hydrocarbons present therein, and then burning the remaining gas whereby to form a deposit of carbon black, substantially as specified.

3. The method of producing carbon black from hydrocarbon gas which comprises taking the gas, conducting the same to a closed receptacle, and to burners located without said closed receptacle whereby to heat the gas within said receptacle and to cause the carbon black to be deposited upon the exterior of said receptacle, substantially as specified.

4. The method of producing carbon black from natural gas which comprises taking the raw gas, passing the same through a heating receptacle, separating the gas from the condensible hydrocarbons, and then utilizing the separated gases to heat the raw gas, and to produce the carbon black, substantially as specified.

5. The method of producing carbon black from natural gas, which consists in taking the raw gas, passing the same through a heating receptacle, introducing a blending medium into said heated gas, separating the heated gas from the condensible hydrocarbons, and then utilizing the separated gas to heat the raw gas and to produce a deposit of carbon black, substantially as specified.

6. The method of producing carbon black from natural gas, which consists in taking the raw gas, passing the same through a heating receptacle, introducing a blending medium into the heated gas prior to chilling the same, chilling the heated gas to separate the condensible hydrocarbons from said gas and then utilizing the separated gas to heat the raw gas and to produce a deposit of carbon black, substantially as specified.

7. The method of producing carbon black from natural gas, which consists in taking the raw gas, passing the same through a heating receptacle, introducing an oil distillate into said heated gas, separating the gas from the condensible hydrocarbons, and then utilizing the separated gas to heat the raw gas and to produce a deposit of carbon black, substantially as specified.

8. The method of producing carbon black from natural gas, which consists in taking the raw gas, passing the same through a heating receptacle, introducing a heated oil distillate into said heated gas, separating the gas from the condensible hydrocarbons, and then utilizing the separated gas to heat the raw gas and to produce a deposit of carbon black, substantially as specified.

9. The method of producing carbon black from natural gas, which consists in taking the raw gas, passing the same through a heating receptacle, introducing kerosene into said heated gas, separating the gas from the condensible hydrocarbons, and then utilizing the separated gas to heat the raw gas and to produce a deposit of carbon black, substantially as specified.

10. The method of producing carbon black from natural gas which comprises taking the raw gas, passing the same through a closed heating receptacle, separating the gas from the condensible hydrocarbons, and then supplying the separated gas to burners whereby to heat said heating receptacle and to cause the carbon black to be deposited upon said heating receptacle, substantially as specified.

11. The method of producing carbon black from natural gas which comprises taking the raw gas, passing the same through a heating chamber; then through a condenser utilizing the raw gas as a cooling medium whereby to separate the gas from the condensible hydrocarbons present therein, and then conducting the remaining gas to a point below said heating chamber, and burning said gas whereby to heat said heating chambar and form a deposit of carbon black thereon, substantially as specified.

12. The method of producing carbon black from natural gas which comprises taking the raw gas, passing the same through a heating chamber; then through a condenser, utilizing the raw gas as a cooling medium, whereby to separate the gas from the condensible hydrocarbons present therein, and then conducting the remaining gas to the exterior of said heating chamber, and burning said gas whereby to heat said heating chamber and form a deposit of carbon black thereon, removing the carbon deposit from the outer surface of said heating chambers and thence conveying the same to a point of collection, substantially as specified.

13. The method of producing carbon black from natural gas, which comprises taking the raw gas, passing the same through an elongated heating chamber, then through a condenser, utilizing the raw gas as a cooling medium whereby to separate the gas from the condensible hydrocarbons present therein, then conducting the separated gas to a point below said elongated heating chamber and burning said gas whereby to heat the interior of said heating chamber and to form a deposit of carbon black upon the outer surface of said heating chamber, and finally scraping the carbon deposit from the outer surface of said heating chamber and conveying the same to a point of collection, substantially as specified.

Signed at the city of New York, in the county and State of New York, this 27th day of December, one thousand nine hundred and twenty.

LEWIS J. DALES.